United States Patent Office 2,826,527
Patented Mar. 11, 1958

2,826,527

STABILIZED PHOSPHIDE PESTICIDE COMPOSITION

Ludwig Hüter, Frankfurt am Main, Germany, assignor to Deutsche Gold- und Silber-Scheideanstalt vormals Roessler, Frankfurt am Main, Germany No Drawing. Application June 17, 1953
Serial No. 362,397

Claims priority, application Germany July 2, 1952

8 Claims. (Cl. 167—14)

The present invention relates to improvements in pest control with the aid of phosphine evolved from phosphides and is especially adapted for the control of living pests such as rodents and insects in warehouses and other storage spaces as well as in the ground, with the aid of pressed bodies, particularly, tablets containing phosphides which decompose in damp or moist air to form phosphine in combination with materials which decompose in air at moderately raised temperature and particularly those which evolve inert gases such as, carbon dioxide and ammonia.

As the toxicity of phosphine is greater than that of the volatile fumigants usually employed for pest control and is equal to the acute toxicity of hydrogen cyanide, there have been many attempts to introduce its use in pest control. However, a number of difficulties are encountered in the generation and use of phosphine which have prevented widespread acceptance of its use. Such difficulties primarily reside in the spontaneous ignitibility and combustibility of phosphine and in the formation of highly poisonous residues and in that it has previously not been possible to effect the decomposition of the phosphides in such a way that they completely decompose within practical periods. The handling of the phosphide as well as the phosphine therefore required very special precautions. Consequently, only one procedure employing phosphides was successfully introduced for limited application. In such procedure, aluminum phosphide was introduced into the material or space to be treated in a jacket of water vapor and air permeable material which nevertheless protected the phosphide from contact with larger quantities of water. The evolution of phosphine therefrom was steadily, but relatively slow so that long fumigation periods were required to obtain a satisfactory kill. It was only under these conditions in which only small concentrations of phosphine prevailed that the danger of spontaneous ignition or explosion could be avoided. As complete decomposition of the phosphide could not be effected in this way, it is necessary to remove the jacket or bag containing the undecomposed phosphide after completion of the fumigation and carefully destroy it as the residue is highly poisonous and upon access to moisture it is spontaneously ignitable. In view of the incomplete decomposition achieved in this method, the quantity of aluminum phosphide required to effect a suitable kill is relatively large.

In accordance with the invention, it was discovered that the difficulties in using phosphides for the evolution of phosphine could be effectively overcome by employing phosphides in the form of pressed bodies or tablets which also contain a quantity of material which will decompose in air at moderately raised temperatures and preferably will evolve inert gases under the conditions of decomposition of the phosphides in such tablets. Besides the fact that the pressed phosphide containing bodies permit more simple and accurate dosage of the phosphides, such pressed bodies have a relatively smaller surface area than the previously employed coarsely granulated phosphides and consequently they are less liable to premature decomposition.

It was found that the formation of phosphine from the pressed bodies containing phosphides and material which decomposes at moderately raised temperatures follows a rather unexpected course, as the high voluminous residues formed from the phosphides, for example, aluminum oxyhydrate, from aluminum phosphide, and the decomposition of the added material not only causes rapid evolution of the desired phosphine with rapid disintegration of the pressed bodies, but also provides conditions which substantially avoid spontaneous ignition of the phosphine evolved and the danger of explosions. The disintegration of the pressed bodies sets free a relatively large surface and permits a thorough and complete reaction between the phosphide and the water vapor, so that, if the surrounding medium contains sufficient moisture, shortly after the evolution of phosphine has begun the evolution quickly increases to a rate providing a concentration of phosphine which will suffice for an effective kill of pests in a few hours. Furthermore, the high rate of evolution of phosphine generally decreases to such an extent after a few hours, that the quantity of phosphine still produced is completely used up by surface absorption or surface oxidation in the goods fumigated. Consequently, the fumigation is completed after only a few hours, and the fumigated spaces can be entered and used without danger after a comparatively short time.

A further advantage of the pressed bodies according to the invention is that the disintegration of the bodies during the fumigation with the formation of highly voluminous residues with the ensuing decomposition of the poisonous phosphide is so complete that such residues are non-poisonous and need not be removed from the space or goods fumigated. Consequently, it is not necessary to provide special protective jackets or bags to facilitate removal of the residues when employing the phosphide containing pressed bodies according to the invention, as was the case when the prior art methods were employed.

All phosphides can be employed according to the invention which react with water with the evolution of phosphine such as, for example, calcium phosphide, magnesium phosphide and aluminum phosphide. However, aluminum phosphide has been found especially adapted for the formation of the pressed bodies or tablets according to the invention.

The decomposable materials combined with the phosphides in the pressed bodies according to the invention preferably are such that in decomposing in air at moderately raised temperatures they evolve carbon dioxide and in some instances also ammonia. For example, the following materials have been found particularly suitable: sodium bicarbonate, ammonium carbonate, ammonium bicarbonate, hartshorn salt, ammonium carbamate, ammonium cyanate, urea and substituted ureas. Such compounds decompose under the influence of the heat evolved during the decomposition of the phosphides to form a gas blanket of carbon dioxide and in some instances ammonia, which to a certain extent acts as a protective gas atmosphere and completely avoids the spontaneous ignitibility of the phosphine evolved even in higher concentrations. Furthermore, the vaporization of the water which may be produced in the decomposition of such decomposable materials to a large extent carries off the heat evolved by the hydrolysis of the phosphide so that the total temperature of the phosphide-water system is maintained under the critical ignition temperature of phosphine. Furthermore, it has been found that under some circumstances the evolution of carbon dioxide and ammonia leads to a noticeable increase in the activity of the poisonous gas, phosphine, which evidently is caused by the respiration stimulation effected by the carbon dioxide and a certain attracting action of the ammonia. This increase in activity is clearly evident in that the quantity of phosphide required for an effective fumigation is noticeably lower when materials evolving such gases are incorporated in the pressed bodies according to the invention.

The quantity of the easily decomposable carbon dioxide and carbon dioxide and ammonia evolving materials can vary within wide ranges depending upon the nature of the material employed. In general, however, it has been found that good results are obtained with pressed bodies which in addition to the phosphide contain 10 to 80% and preferably 33 to 55% of such decomposable material or materials. Such materials may be admixed with the comminuted phosphide shortly before the pressed bodies are formed, but preferably they are admixed with the phosphides before they are comminuted, as it was found that the phosphides when admixed with such decomposable materials could be ground to finest particle size with little danger of spontaneous ignition or explosion during the grinding operation and the following pressing of the mixture to tablets as well as the packaging of such tablets.

In one particularly advantageous embodiment of the present invention the tablets are formed from extremely finely divided phosphides, as it was found that the fine subdivision of the phosphides before shaping into pressed bodies leads to a rapid production of phosphine as well as complete decomposition of the phosphides contained in the pressed bodies during use. Consequently, the admixture of the decomposable materials such as for example, ammonium carbonate, ammonium carbamate, ammonium bicarbonate and sodium bicarbonate with the phosphides before comminution is of special significance as such measure renders it possible to effect a non-dangerous and especially intensive comminution of the phosphides. The average particle size of the phosphides before they are formed into the shaped bodies according to the invention advantageously is not above $600\mu$ ($6 \cdot 10^{-2}$ cm.) preferably not above $150\mu$ ($1.5 \cdot 10^{-2}$ cm.).

The pressed bodies or tablets according to the invention offer a number of advantages which renders it possible to employ phosphine in pest control in a far greater field than was hitherto possible. Of particular advantage is the fact that such pressed bodies containing phosphides are not dangerous to handle or use, even by unskilled persons as well as the fact that in use they decompose quickly and completely so that short fumigation periods at optimum conditions are possible. The short period required for the decomposition of the phosphide and the completeness of such decomposition to leave residues which are neither poisonous nor inflammable, render it possible to introduce the pressed bodies directly into the goods to be fumigated and render it unnecessary to remove the residues after fumigation. It is possible to reenter and use the spaces after fumigation without special airing. The use of gas masks is not required when the pressed phosphide containing bodies according to the invention are introduced into the space or material to be fumigated nor when the fumigated spaces are reentered after fumigation. Furthermore the relatively small quantities of phosphides when employed in the form of pressed bodies in comparison with those previously required with the prior methods of application is of special advantage.

The pressed phosphide containing bodies according to the invention are not only suited for fumigating grain stored in silo cells or bins, but also for fumigating grain and feeds before being shipped. They are furthermore suited for pest control in storage and distributing rooms for foods, for example, flour mills, food warehouses and the like. It is not necessary to employ special measures for sealing the spaces to be fumigated according to the invention. The ease of dosage and the economical consumption of the pressed bodies according to the invention render it possible for example, to feed the phosphide containing tablets continuously to materials as they are introduced into silos or carriers for transporting such materials. For this purpose, for example, the pressed bodies according to the invention can be introduced into chutes or tubes for conveying grain to the silos or carriers by appropriate means at suitable intervals depending upon the quantity of grain being delivered.

The pressed phosphide containing bodies according to the invention are also particularly suited for control of living pests in soil. It is, for example, possible to introduce the phosphide containing tablets according to the invention into any desired spot such as nests and runs of rodents with the aid of a suitable sound or depositor, or to incorporate the desired quantity into soil while it is being worked, for instance, by attaching a suitable dosing device on a plow.

The pressed bodies or tablets according to the invention are particularly adapted to be deposited in the location where they are to serve their fumigating purposes by means of sounds or depositors which render it possible to deposit the bodies or tablets without substantial access to air, for example, in soil, loosely packed materials, such as, grain and the like, or holes in the earth without the necessity of having the operator come in direct contact with the pressed bodies or tablets. Such sounds or depositors can, for example, be constructed similarly to seed planters and generally comprise a tube provided with an opening at or near its lower end through which the fumigating tablet is deposited in the material to be fumigated and a magazine for holding a supply of such tablets for regulated delivery to the tube. Preferably the magazine and delivering mechanism are so constructed as to prevent premature access of moisture from the air to the tablets held in the magazine. For example, the magazine can be arranged to hold a stack of the tablets which rest upon one of a pair of suitably spaced laterally movable tongues which, for instance, can be actuated by lever so as to drop an individual tablet into the depositing tube. Preferably the tongue upon which the stack is supported substantially closes off the delivery opening in the magazine so as to prevent premature access of moist air to the tablets before they are delivered to the depositing tube.

The following examples will serve to illustrate the novel fumigating bodies according to the invention.

*Example 1*

Crude aluminum phosphite was mixed with an equal quantity of ammonium carbamate and the mixture ground until it passed without substantial residue through a sieve having 6000 meshes per cm.$^2$ to provide a particle size of less than $150\mu$. The resulting finely powdered mixture was then compressed to tablets 20 mm. in diameter and 6 mm. thick upon a continuously operating rotary press providing a pressure of 3 kg./cm.$^2$. About 5 to 10 of the resulting tablets sufficed for the fumigation per cubic meter of space or grain to effect a complete kill of grain weevils.

*Example 2*

A 40:60 mixture of calcium phosphide and hartshorn salt was ground and compressed into tablets as in Example 1, but employing a pressure of 6 kg./cm.$^2$. In use, 10 to 15 of these tablets suffice for fumigation of 1 cubic meter.

*Example 3*

20 parts of finely ground aluminum phosphide were mixed with 80 parts of sodium bicarbonate and this mixture pressed into tablets 6 mm. in diameter and 6 mm. thick using a pressure of 5 kg./cm.$^3$. These tablets were especially suited for soil fumigation for control of rodents and the like.

I claim:
1. A tablet adapted for use in pest control of a compressed admixture of a finely divided metal phosphide capable of being decomposed by water to form phosphine, the average particle size of said finely divided metal phosphide being less than $6.10^{-2}$ cm., and at least one substance which decomposes in air at moderately elevated temperature with the evolution of an inert noncombustible gas containing carbon dioxide selected from the group consisting of sodium bicarbonate, ammonium carbonate, ammonium bicarbonate, hartshorn salt, ammonium carbamate, ammonium cyanate and urea, said substance being present in a quantity sufficient that the gas evolved under influence of the heat of hydrolysis of the phosphide upon access of water to such tablet suppresses spontaneous combustion of the hydrogen phosphide evolved from the metal phosphide upon access to such water.

2. A tablet in accordance with claim 1, in which said phosphide is aluminum phosphide.

3. A tablet in accordance with claim 1, in which said finely divided phosphide has an average particle size of less than $1.5 \cdot 10^{-2}$ cm.

4. A tablet in accordance with claim 1, in which said substance which decomposes at moderately elevated temperature comprises 10–80% of said admixture.

5. A tablet in accordance with claim 1, in which said substance which decomposes at moderately elevated temperature comprises 33–55% of said admixture.

6. A tablet in accordance with claim 1, the substance which decomposes at moderately elevated temperature being ammonium carbonate.

7. A tablet in accordance with claim 1, the substance which decomposes at moderately elevated temperature being ammonium carbamate.

8. A tablet in accordance with claim 1, the substance which decomposes at moderately elevated temperature being urea.

References Cited in the file of this patent

UNITED STATES PATENTS

| | | |
|---|---|---|
| 2,080,179 | Merriam | May 11, 1937 |
| 2,117,158 | Freyberg | May 10, 1938 |
| 2,189,947 | Griffith | Feb. 13, 1940 |

OTHER REFERENCES

Merck Index, 6th ed., 1952, pp. 62–63, Merck and Co., Rahway, N. J.

Little: Flameproofing Textile Fabrics, Reinhold Pub. Corp., N. Y. C., 1947, p. 82.